UNITED STATES PATENT OFFICE.

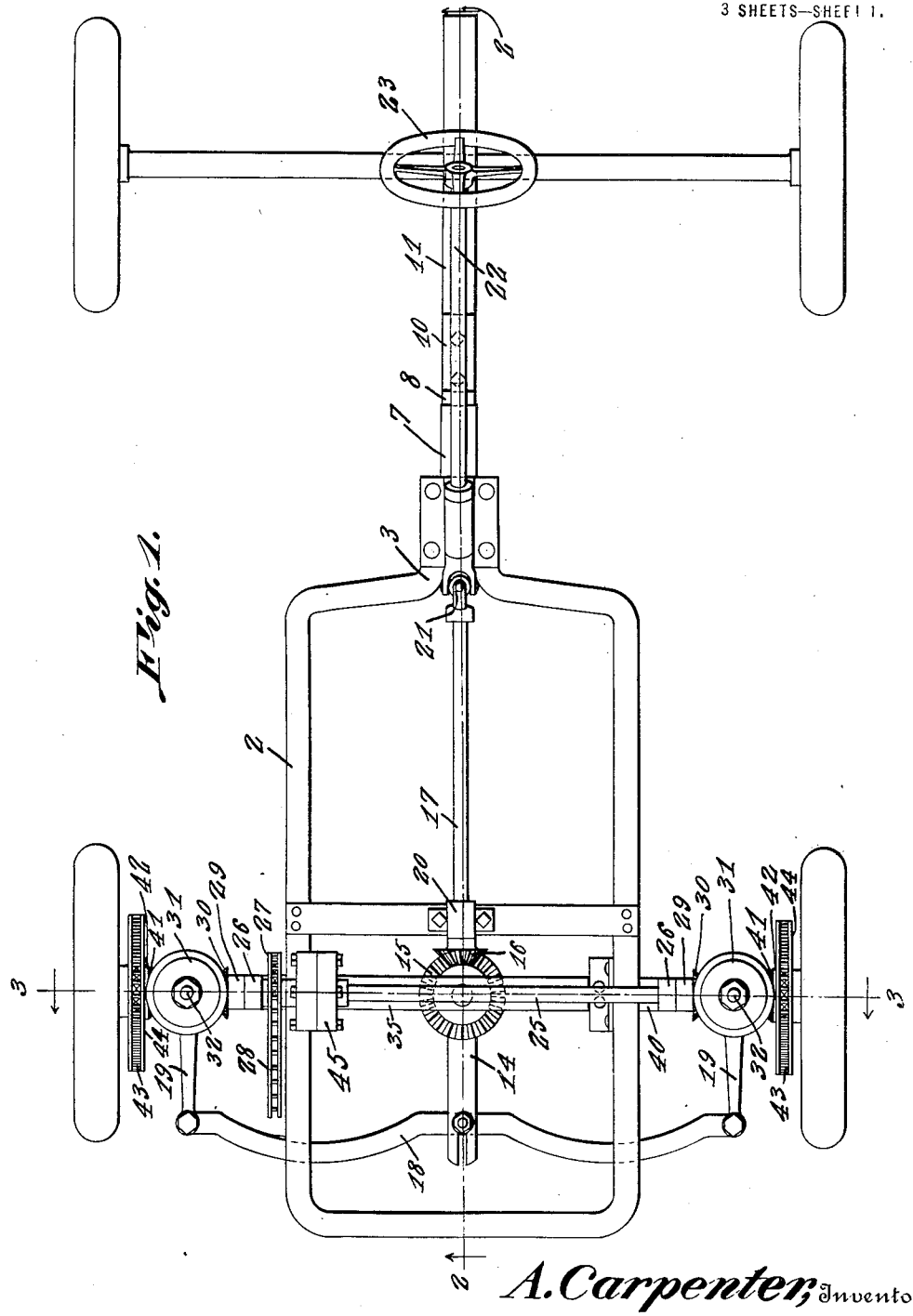

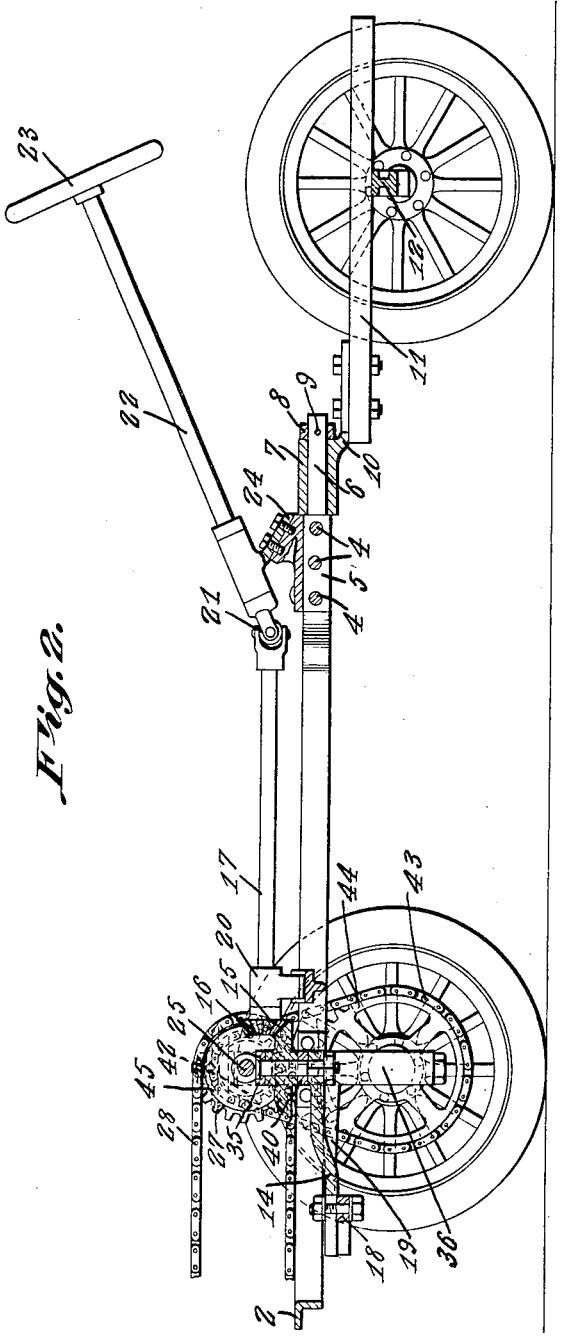

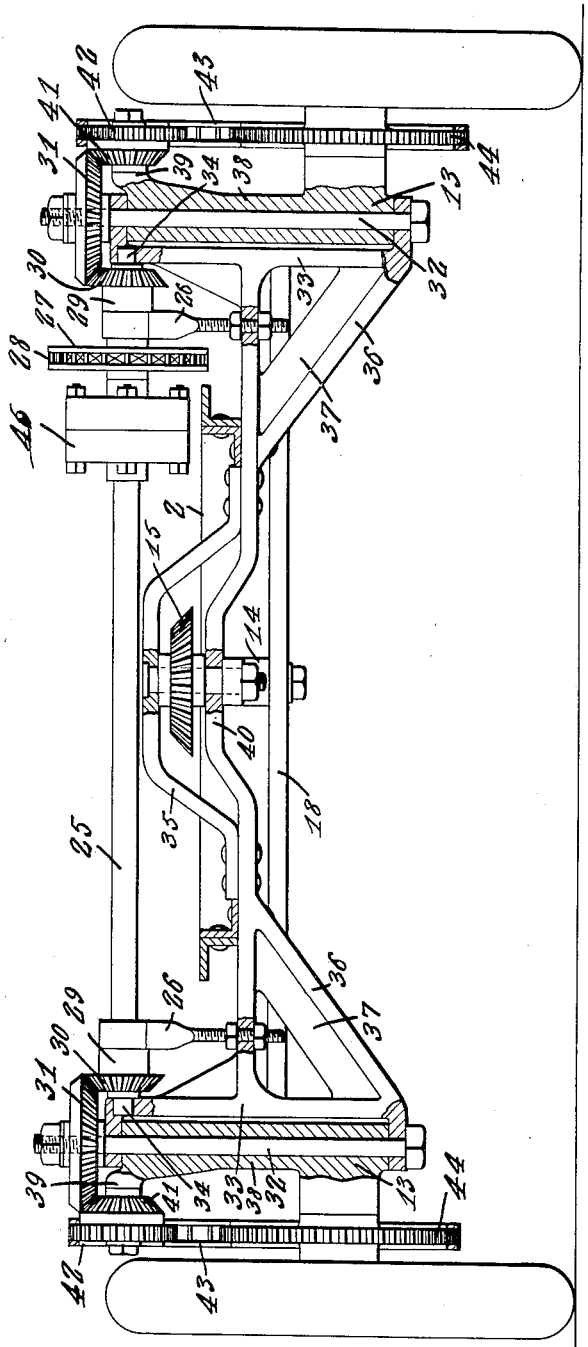

ALEXANDER CARPENTER, OF CAREY, OHIO.

TRACTOR.

1,371,859.	Specification of Letters Patent.	Patented Mar. 15, 1921.

Application filed March 26, 1919. Serial No. 285,274.

*To all whom it may concern:*

Be it known that I, ALEXANDER CARPENTER, a citizen of the United States, residing at Carey, in the county of Wyandot and State of Ohio, have invented a new and useful Tractor, of which the following is a specification.

This invention relates to improvements in tractors, the primary object of the invention being to provide an improved tractor in which the power is applied to the front or steering wheels, and which is adapted for connection to different kinds of farm and other implements.

A further object of the invention is to generally improve the construction of tractors of the character set forth.

With the foregoing and other objects in view, which will appear as the description proceeds, the invention consists in the novel features of construction and combination of parts which will be more fully described hereinafter and particularly pointed out in the claim.

In the drawings accompanying and forming part of this specification,

Figure 1 is a plan view of my improved tractor, the engine being omitted;

Fig. 2 is a longitudinal section taken on the line 2—2 of Fig. 1, looking in the direction of the arrows; and Fig. 3 is a cross section taken on the line 3—3 of Fig. 1.

The same characters of reference designate the same parts in the different figures of the drawings.

Referring to the drawings, 2 designates the engine frame, which is of rectangular form, the ends being brought together toward the rear, as shown at 3, Fig. 1, and secured together by means of bolts 4 passing through openings in the ends 3, a swivel coupling member 6 having the rectangular portion 5 thereof interposed between the ends 3 of the frame and provided with openings for the passage of the bolts 4. The cylindrical portion of the swivel member 6 projects toward the rear and is adapted to receive a sleeve 7 having a bore of the same diameter as the cylindrical portion, and for securing the sleeve 7 on said cylindrical portion for rotation thereon a washer 8 is placed on the end of the cylindrical portion and a pin 9 passed through openings in the washer and cylindrical portion, as shown in Fig. 2. The sleeve 7 is provided with a rearwardly extending offset portion 10 at its underside, to which may be secured in any suitable manner, as for instance by bolts and nuts, a tongue 11, which is secured to the rear axle 12 and to which may be attached implements of any desired form.

The front axle 40 is provided with the usual steering knuckles 13, the movement of which is controlled by a steering arm 14 secured to a bevel gear 15 mounted on a stub shaft having its lower bearing in the axle 40 and its upper bearing in a member 35 secured at its ends to the axle, said gear meshing with a second bevel gear 16 fixed to the end of a steering rod 17. A crosswise extending bar 18, pivotally secured at its ends to arms 19 extending forwardly from the steering knuckles 13, is pivotally secured at the center of its length to the steering arm 14. The steering rod 17 is mounted near its front end in a suitable bearing 20 secured to the frame, the opposite end of the rod being connected by means of a universal joint 21 with a steering post 22 carrying at its upper end the usual steering wheel 23. The universal joint is mounted on a suitable bracket 24 secured to the end of the frame which carries the swivel member 6.

For applying power to the steering wheels, a differential shaft 25 is journaled in bearings carried by vertical brackets 26 secured to the axle 40, a sprocket wheel 27 being fixed to said shaft and adapted to receive power from the engine by means of a chain 28. Fixed to a collar 29 secured to each end of the shaft 25 is a bevel pinion 30 adapted to mesh with a bevel gear 31 mounted for rotation upon the upper end of the vertical rod 32 by means of which the steering knuckle is pivoted, the rods 32 being journaled in bearings carried by vertical brackets 33 formed on the ends of the axle. Each of the pinions 30 is provided with a trunnion 34 that has a bearing in the vertical portion of the bracket 33. For sustaining the additional weight placed on the axle 40, I provide at each end thereof a diagonal brace member 36 extending from the lower end of the bracket 33 to the axle, as shown in Fig. 3, and having a strengthening web 37, the brace member and web being preferably formed integral with the axle and bracket 33. The steering knuckles 38 carrying the wheel bearings are pivoted, as hereinbefore stated, on the vertical rods 32, and these knuckles are extended upwardly so as to fit between the bearings carried by the vertical brackets 33. The knuckles 38 are each provided with a laterally extending projection or lug 39 having a threaded opening adapted to receive the end of a stub shaft on which is rotatably mounted a bevel pinion 41 adapted to mesh with the gear 31 on the upper end of the rod 32. The pinion 41 has rigidly secured thereto a sprocket wheel 42 adapted to transmit power by means of a chain 43 to a sprocket wheel 44 secured to the hub of the tractor wheel. The usual differential gearing is inclosed in a housing or gear case 45 on the shaft 25.

It will readily be seen that power is transmitted from the engine by means of the chain 28 to the sprocket wheel 27 on the differential shaft 25, whereby the bevel pinions 30 rotate the idler gears 31, which in turn rotate the pinions 41, thereby transmitting power to the tractor wheels through the chain and sprocket connections 42, 43 and 44.

While I have described in detail the structure illustrated herein, it is to be understood that I do not thereby limit my invention to the precise features of construction shown, as I am aware that many mechanical changes may be made therein without departing from the spirit and scope of the invention as set forth in the appended claim.

Having thus described my invention, what I claim is:

A tractor including a frame, an axle affixed thereto, vertical brackets at the ends of the axle, each bracket having laterally extending upper and lower bearings arranged in pairs, a steering knuckle inserted between the upper and lower bearings of each pair, a pivot rod extending through the bearings and knuckle and projecting upwardly beyond the knuckle, a gear journaled on the projecting portion of the rod, a differential shaft, a gear thereon meshing with the gear upon the rod, laterally extending studs upon the knuckle, sprockets mounted thereon, a supporting wheel revoluble with one of the sprockets, a chain for transmitting motion between the sprockets, and a gear revoluble with one of the sprockets and meshing with the gear upon the rod.

In testimony that I claim the foregoing as my own, I have hereto affixed my signature in the presence of two witnesses.

ALEXANDER CARPENTER.

Witnesses:
C. G. HUSTON,
HERBERT NEWHARD.